(12) United States Patent
Thrimawithana et al.

(10) Patent No.: US 11,302,025 B2
(45) Date of Patent: Apr. 12, 2022

(54) ERROR MITIGATION FOR MOBILE DIMENSIONING IN STEREO VISION

(71) Applicant: ZEBRA TECHNOLOGIES CORPORATION, Lincolnshire, IL (US)

(72) Inventors: Raveen T. Thrimawithana, Pannipitiya (LK); Michael Wijayantha Medagama, Nawala (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 315 days.

(21) Appl. No.: 16/696,533

(22) Filed: Nov. 26, 2019

(65) Prior Publication Data
US 2021/0158558 A1    May 27, 2021

(51) Int. Cl.
*G06T 7/62* (2017.01)
*G06T 7/174* (2017.01)
*G06T 11/20* (2006.01)
*G06F 3/04842* (2022.01)
*G06T 19/20* (2011.01)

(52) U.S. Cl.
CPC ............ *G06T 7/62* (2017.01); *G06F 3/04842* (2013.01); *G06T 7/174* (2017.01); *G06T 11/203* (2013.01); *G06T 19/20* (2013.01); *G06T 2210/12* (2013.01); *G06T 2219/2016* (2013.01)

(58) Field of Classification Search
CPC ......... G06T 7/62; G06T 7/174; G06T 11/203; G06T 19/20; G06T 2210/12; G06T 2219/2016; G06T 19/006; G06F 3/04842; G06F 3/0484
See application file for complete search history.

(56) References Cited

U.S. PATENT DOCUMENTS

| 9,898,833 | B1 | 2/2018 | Jankevics et al. |
| 10,163,216 | B2 | 12/2018 | Ackley |
| 10,593,042 | B1 * | 3/2020 | Douillard ............... G06K 9/34 |
| 2016/0328856 | A1 * | 11/2016 | Mannino ................ G06T 7/73 |
| 2018/0089505 | A1 * | 3/2018 | El-Khamy ............. G06T 7/11 |
| 2018/0231371 | A1 | 8/2018 | Galin et al. |
| 2020/0066036 | A1 * | 2/2020 | Choi ..................... G06T 7/75 |

* cited by examiner

*Primary Examiner* — Christopher M Brandt

(57) ABSTRACT

The present disclosure provides techniques for dimensioning an object by capturing two three-dimensional images of the object from orthogonal perspectives. For instance, a first three-dimensional image of a first side of a target object, and a second three-dimensional image of an orthogonal side of the generally cuboid object may be captured using a three-dimensional camera. A first two-dimensional axis-aligned minimum bounding box may be generated based on the first three-dimensional image and a second two-dimensional axis-aligned minimum bounding box may be generated based on the second three-dimensional image. The dimensions of the object may be calculated using the width of the first axis-aligned two-dimensional minimum bounding box, the width of the second axis-aligned two-dimensional minimum bounding box, and the greater of the height of the first axis-aligned two-dimensional minimum bounding box and the height of the second axis-aligned two-dimensional minimum bounding box.

16 Claims, 14 Drawing Sheets

ERROR MITIGATION FOR MOBILE DIMENSIONING IN STEREO VISION

BACKGROUND OF THE INVENTION

In inventory and shipping environments, a pallet must be dimensioned to determine the cost of the pallet to a customer, as well as to determine how much storage space the pallet requires (e.g., in a warehouse, on a delivery truck, etc.) Traditionally, workers in inventory and shipping environments determine the dimensions of a pallet by measuring the length, width, and height of a pallet by hand (e.g., using a tape measure). However, dimensioning a pallet by hand is time-consuming and inefficient, and may not be accurate. Moreover, while it is possible to accurately dimension objects using Simultaneous Localization and Mapping (SLAM) techniques, SLAM techniques are computationally complex, so dimensioning objects in this way requires advanced computing devices that are generally more expensive, making it practically difficult to equip each worker in a large inventory environment with such devices. Furthermore, while it is possible to accurately dimension objects using fixed three-dimensional cameras, dimensioning objects in this way requires workers in the inventory environment to physically bring objects to be dimensioned to the location where the fixed three-dimensional cameras are positioned, which can be time-consuming and inefficient when dimensioning large or heavy objects, or when dimensioning a large total number of objects.

SUMMARY

The present disclosure provides techniques for dimensioning an object by capturing two three-dimensional images of the object from orthogonal perspectives. For instance, a first three-dimensional image of a first face of a generally cuboid object, such as a pallet, and a second three-dimensional image of an orthogonal face of the generally cuboid object may be captured using a three-dimensional camera. A first two-dimensional minimum bounding box may be generated based on the first three-dimensional image and a second two-dimensional minimum bounding box may be generated based on the second three-dimensional image. The dimensions of the object may be calculated using the width of the first two-dimensional minimum bounding box, the width of the second two-dimensional minimum bounding box, and the greater of the height of the first two-dimensional minimum bounding box and the height of the second two-dimensional minimum bounding box.

In some examples, the dimensioning techniques may include displaying a graphical representation of the first two-dimensional minimum bounding box and/or the second two-dimensional minimum bounding box via a user interface display. For instance, the graphical representation of the first and second two-dimensional minimum bounding boxes may be overlaid upon the respective first and second three-dimensional images on a user interface display. Accordingly, the user may determine whether the two-dimensional minimum bounding boxes accurately include the entire object (or group of objects) to be dimensioned and no additional objects. For instance, if one of the two-dimensional minimum bounding boxes does not include the entire object to be dimensioned (or all of the objects of a group of objects to be dimensioned), the user may select portions of the object (or additional objects) that should be included in the two-dimensional minimum bounding box via the user interface, and the dimensions of the two-dimensional minimum bounding box may be corrected accordingly. Similarly, if one of the two-dimensional minimum bounding boxes includes an additional object that is not part of or related to the object to be dimensioned, the user may select the additional object that should be excluded from the two-dimensional minimum bounding box via the user interface, and the dimensions of the two-dimensional minimum bounding box may be corrected accordingly.

After corrections are made, the dimensions of the object may be calculated using the (possibly corrected) width of the first two-dimensional minimum bounding box, the (possibly corrected) width of the second two-dimensional minimum bounding box, and the greater of the (possibly corrected) height of the first two-dimensional minimum bounding box and the (possibly corrected) height of the second two-dimensional minimum bounding box.

In one embodiment, a dimensioning method is provided. The dimensioning method comprises: capturing, by a three-dimensional camera from a first perspective, a first three-dimensional image of an environment containing a target object to be dimensioned; generating, by a processor, based on the first three-dimensional image, a first two-dimensional minimum bounding box containing a first side of the target object; determining, by a processor, a first height and a first width of the first two-dimensional minimum bounding box containing the first side of the target object; capturing, by the three-dimensional camera from a second perspective that is orthogonal to the first perspective, a second three-dimensional image of the environment; generating, by a processor, based on the second three-dimensional image, a second two-dimensional minimum bounding box containing a second side of the target object; determining, by a processor, a second height and a second width of the second two-dimensional minimum bounding box containing the second side of the target object; and determining, by the processor, dimensions of the target object based on the first width, the second width, and the greater of the first height and the second height.

In another embodiment, a mobile device is provided, comprising: a three-dimensional camera, a memory storing computer executable instructions, and at least one processor configured to interface with the three-dimensional camera and the memory, and configured to execute the computer executable instructions to cause the mobile device to: capture, by the three-dimensional camera from a first perspective, a first three-dimensional image of an environment containing a target object to be dimensioned; generate, by the at least one processor, based on the first three-dimensional image, a first two-dimensional minimum bounding box containing a first side of the target object; determine, by the at least one processor, a first height and a first width of the first two-dimensional minimum bounding box containing the first side of the target object; capture, by the three-dimensional camera from a second perspective that is orthogonal to the first perspective, a second three-dimensional image of the environment; generate, by the at least one processor, based on the second three-dimensional image, a second two-dimensional minimum bounding box containing a second side of the target object; determine, by the at least one processor, a second height and a second width of the second two-dimensional minimum bounding box containing the second side of the target object; determine, by the at least one processor, dimensions of the target object based on the first width, the second width, and the greater of the first height and the second height.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
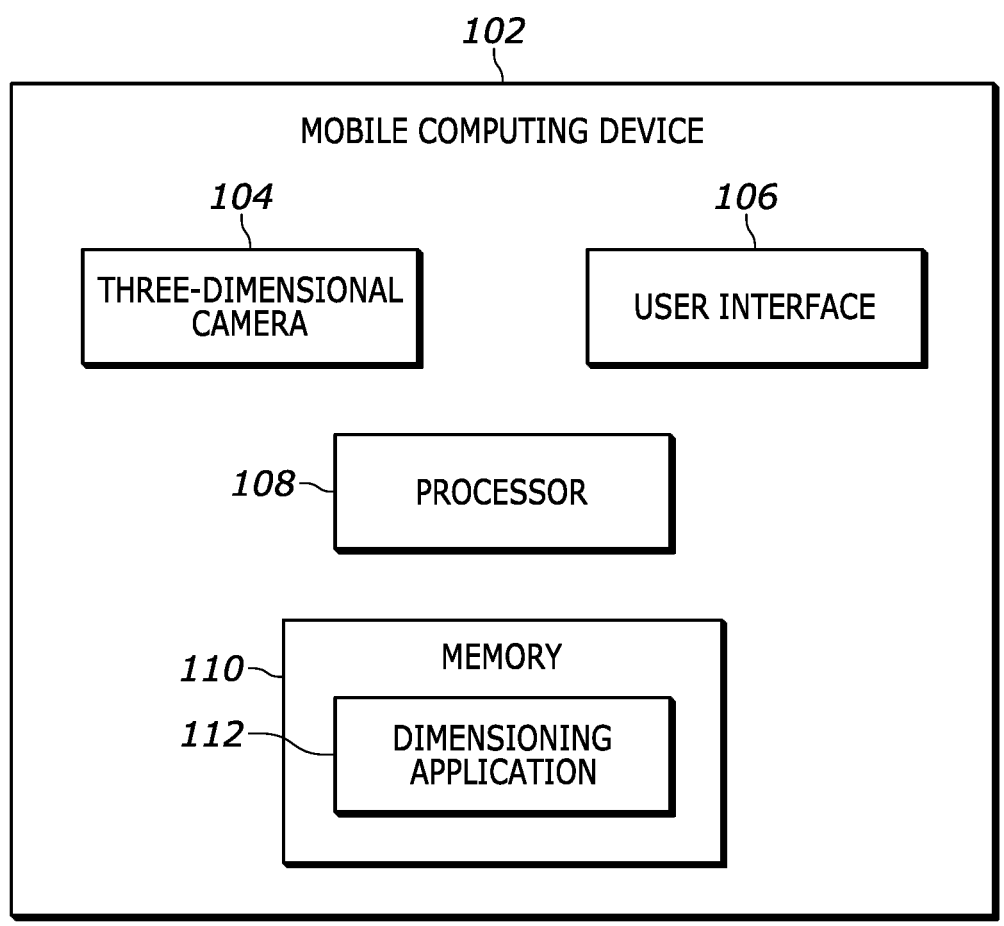
FIG. 1 illustrates a block diagram of a mobile computing device configured to dimension a target object, in accordance with an embodiment.
Figure 2:
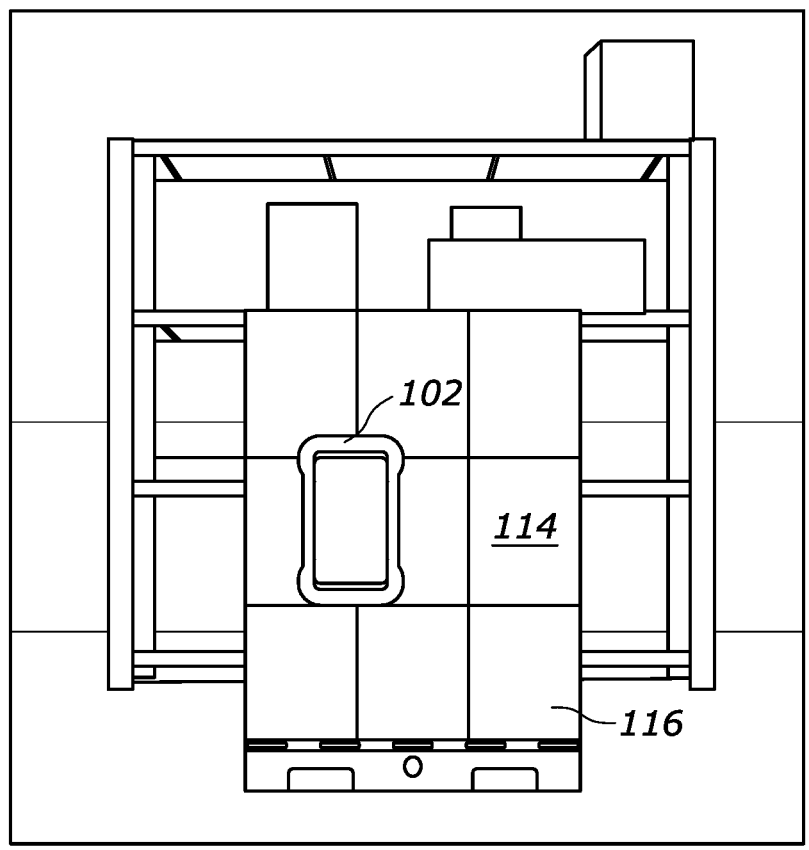
FIGS. 2-5 illustrate examples of several views of a mobile computing device positioned to face a first side or face of a target object to be dimensioned, in accordance with an embodiment.
Figure 3:
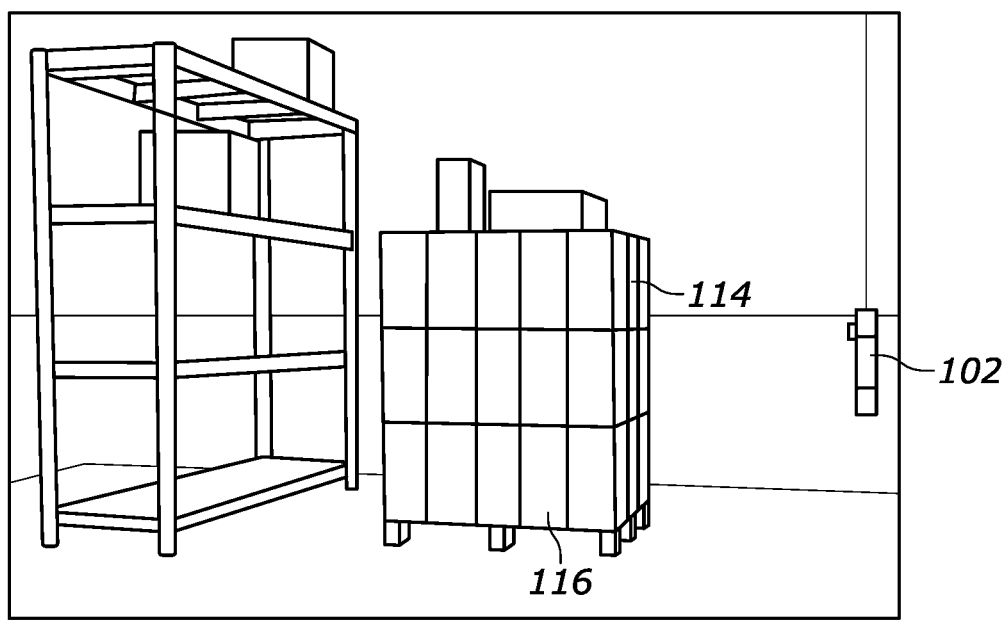
Figure 4:
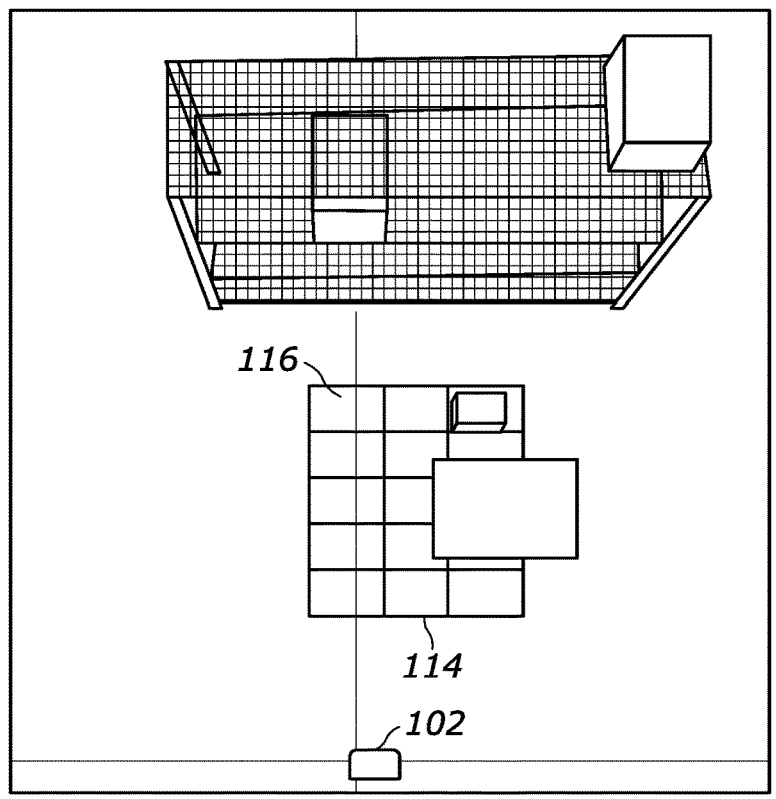
Figure 5:
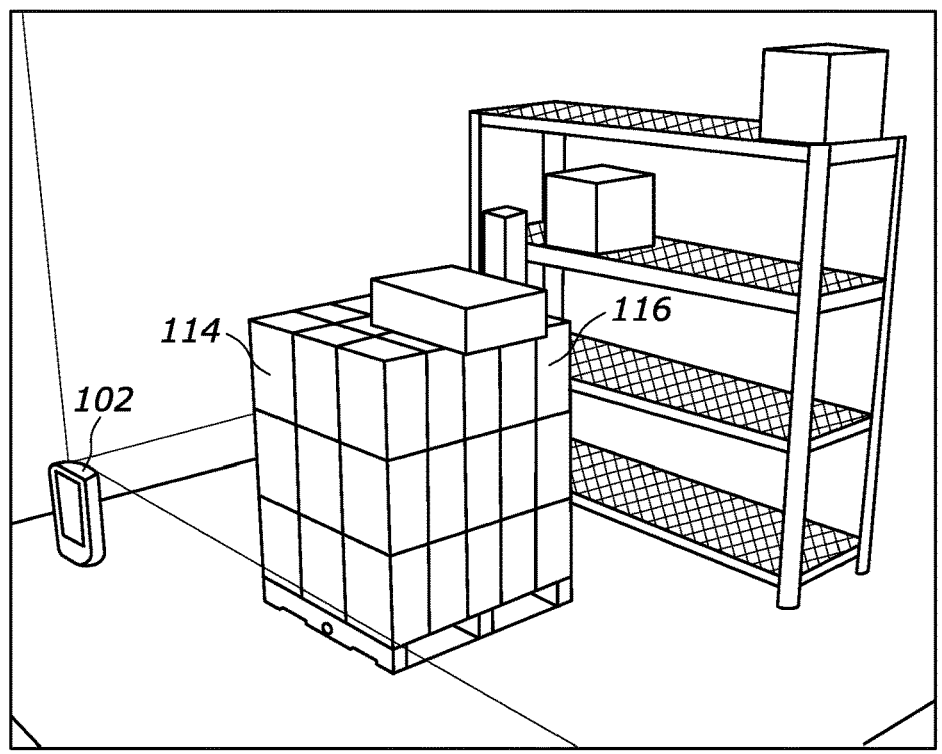

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill.

DETAILED DESCRIPTION OF THE INVENTION

Referring now to the drawings, FIG. 1 illustrates a block diagram of a mobile computing device 102 configured to dimension a target object (or a group of target objects, or a target object and other associated objects collectively, etc.). Generally speaking, the mobile computing device 102 may include a three-dimensional camera 104 configured to capture three-dimensional images (and/or three-dimensional point cloud representations) of objects. Additionally, the mobile computing device 102 may include a user interface 106 configured to display a digital viewfinder display for the three-dimensional camera 104. In some examples, the user interface 106 may also display information to users and/or receive input from users.

Furthermore, one embodiment of the mobile computing device 102 may include a processor 108 such as, for example, one or more microprocessors, controllers, and/or any suitable type of processor. In another embodiment, the processor 108 is a special-purpose dimensioning processor, for example including a specially configured ASIC (Application-specific Integrated Circuit) or FPGA (Field-programmable Gate Array) circuitry optimized for processing three-dimensional images captured by the three-dimensional camera 104. Advantageously, because the initial three-dimensional construction may be done by the three-dimensional camera 104 using the techniques described herein, the computing power required by the processor 108 may be decreased by using the techniques described herein rather than traditional SLAM techniques, where the three-dimensional construction is done entirely by the processor. The mobile computing device 102 may further include a memory 110 (e.g., volatile memory, non-volatile memory) accessible by the processor 108 (e.g., via a memory controller). The example processor 108 interacts with the memory 110 to obtain, for example, computer-readable instructions or other data stored in the memory 110. The machine-readable instructions stored on the memory 128 may include instructions for carrying out any of the steps of any of the methods 900, 1000, 1100, and/or 1200 described in greater detail below at FIGS. 19-22, respectively.

In particular, the memory 110 may store computer-readable instructions for executing a dimensioning application 112 for dimensioning an object or group of objects. In some examples, the dimensioning application 112 may cause the user interface 106 to display instructions for a user. For instance, the dimensioning application 112 may cause the user interface 106 to display an indication that a user should position the three-dimensional camera 104 of the mobile computing device 102 to face a first side or face of a target object to be dimensioned. For example, FIGS. 2-5 illustrate several views of a mobile computing device 102 positioned to face a first side or face 114 of a target object 116. Furthermore, the dimensioning application 112 may cause the user interface 106 to display an indication that the user should position the three-dimensional camera 104 closer to or further from the target object 116, e.g., to ensure that the entire target object 116 or group of target objects is captured by the three-dimensional camera 104. The dimensioning application 112 may cause the three-dimensional camera 104 to capture a first three-dimensional image of the target object 116 (e.g., based on receiving an indication of a user selection of an option to "capture image" via the user interface 106).

Figure 6:
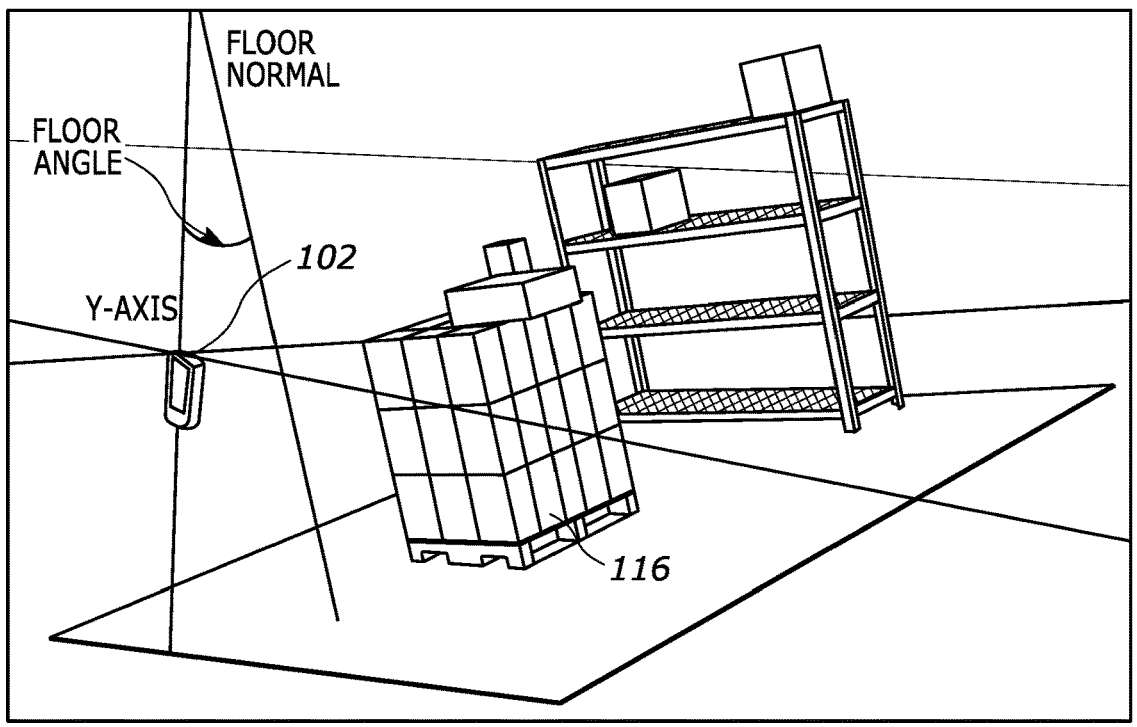
FIGS. 6 and 7 illustrate example ways in which a three-dimensional image of a target object to be dimensioned may be rotated such that an axis-aligned two-dimensional minimum bounding box containing the target object may be generated, in accordance with an embodiment.
Figure 7:
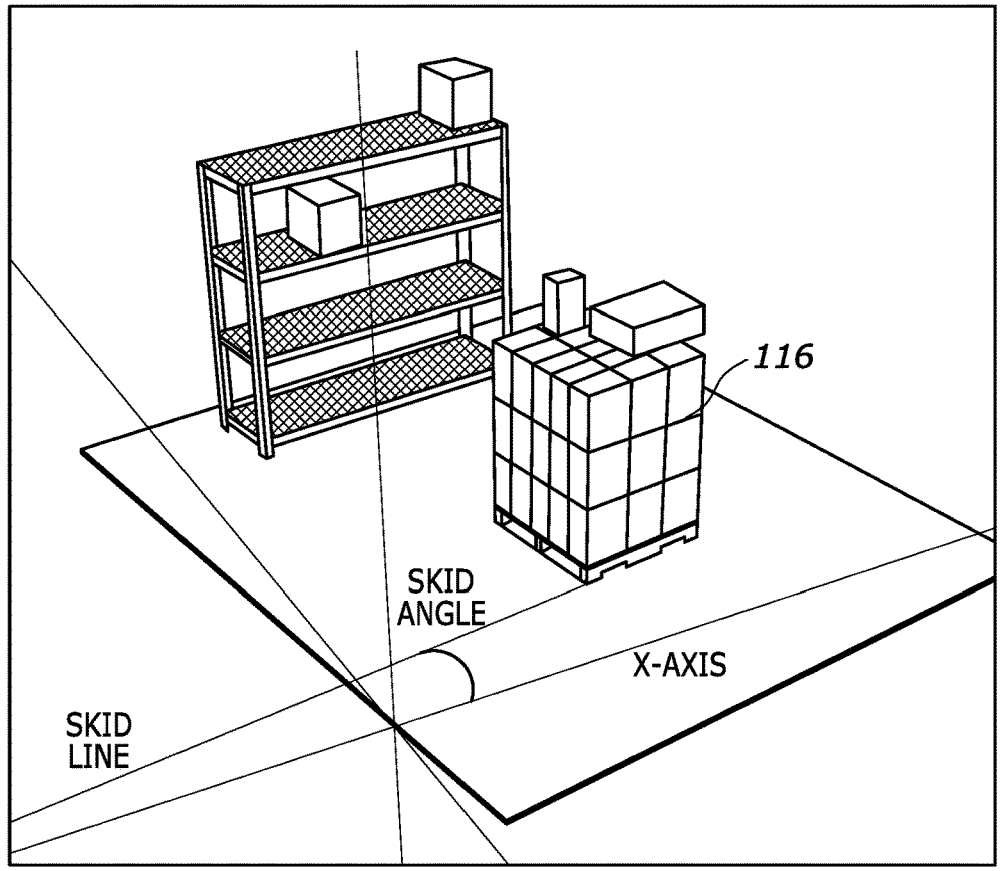

The dimensioning application 112 may determine a height and width of the first side (or face) 114 of the target object 116 based on the first three-dimensional image of the target object 116. In particular, the dimensioning application 112 may analyze the three-dimensional image to determine a plane of the floor or ground in the three-dimensional image, and rotate the captured three-dimensional image so that the plane of the floor or ground is aligned with the X-Z plane of an internal coordinate system of the dimensioning application 112, e.g., as shown in FIG. 6. Next, the dimensioning application 112 may segment the target object 116 from the background and the ground or floor in the rotated three-dimensional image, i.e., such that the segmented three-dimensional image contains the first side 114 of the target object 116 but excludes the floor and the environment. Furthermore, the dimensioning application 112 may further rotate the segmented three-dimensional image so that an edge of the target object 116 (e.g. a "skid" of a pallet) is aligned with the X axis of the internal coordinate system, e.g., as shown in FIG. 7. Using the axis-aligned and segmented three-dimensional image, the dimensioning application 112 may generate an axis-aligned two-dimensional minimum bounding box for the first side 114 of the target object 116, with the height of the two-dimensional minimum bounding box being equal to the difference between the maximum Y value and the minimum Y value for the axis-aligned and segmented three-dimensional image, and the width of the two-dimensional minimum bounding box being equal to the difference between the maximum X value and the minimum X value for the axis-aligned and segmented three-dimensional image. Thus, the dimensioning application 112 may determine the height and the width for the first side 114 of the target object 116 based on the height and width of the generated two-dimensional minimum bounding box.

Figure 8:
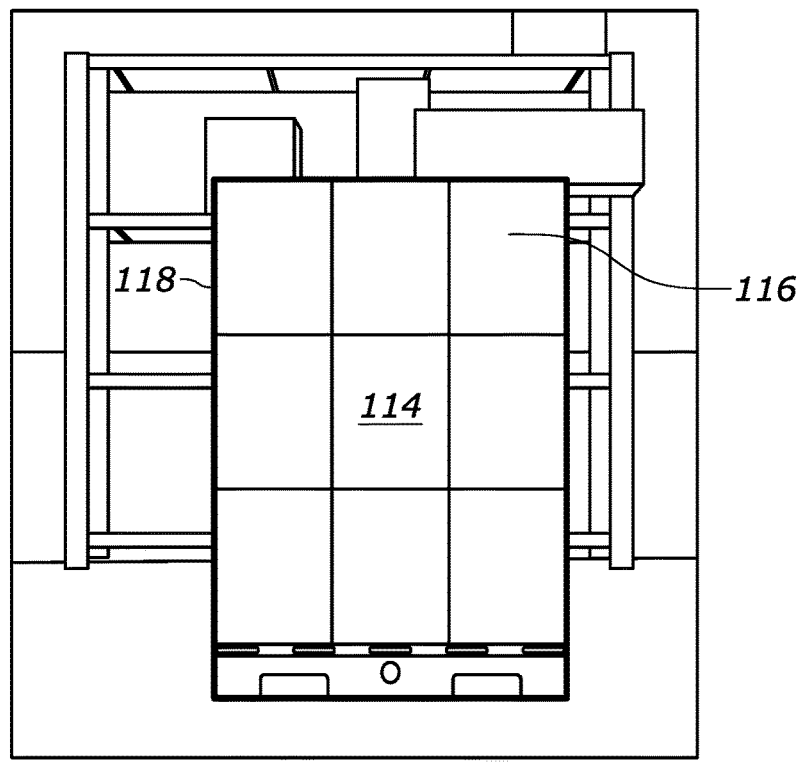
FIGS. 8 and 9 illustrate example user interface displays showing several views of a representation of an axis-aligned two-dimensional minimum bounding box containing a first side of the target object, overlaid over a viewfinder display of the target object, in accordance with an embodiment.
Figure 9:
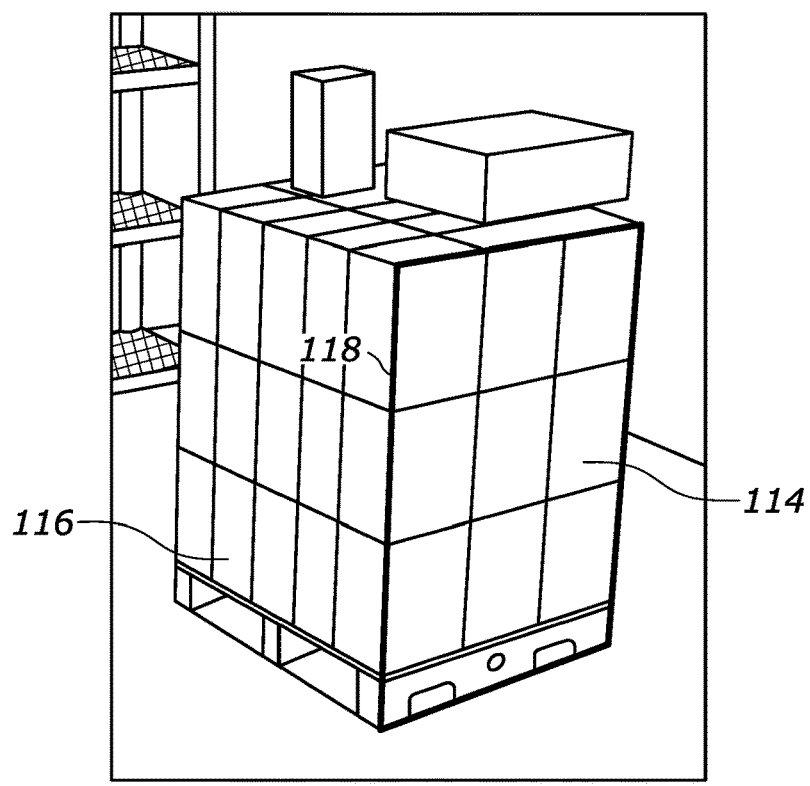

In some examples, the dimensioning application 112 may cause the user interface 106 to display an image representing the two-dimensional minimum bounding box (e.g., an image representing the two-dimensional minimum bounding box overlaid over the viewfinder display for the three-dimensional camera 104). For instance, FIGS. 8 and 9 illustrate example user interface displays showing several views of a representation of an axis-aligned two-dimensional minimum bounding box 118 for the first side 114 of the target object 116 overlaid over a viewfinder display of the target object 116.

Figure 11:
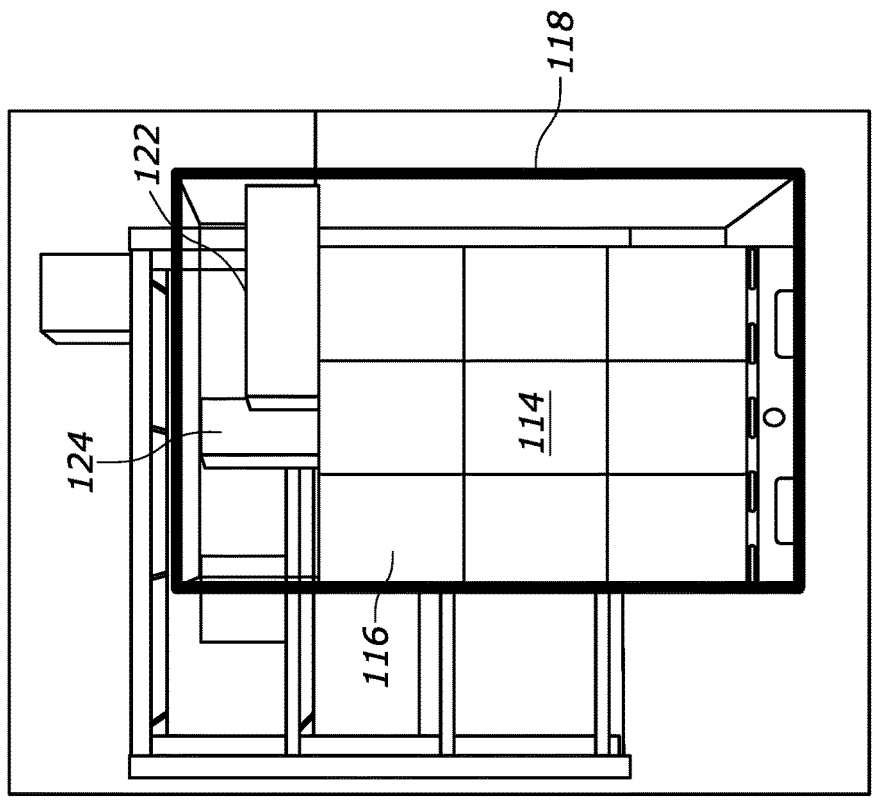
FIG. 11 illustrates an example user interface display of a representation of a corrected two-dimensional minimum bounding box containing the first side of the target object, overlaid over a viewfinder display of the target object, in accordance with an embodiment.
Figure 10:
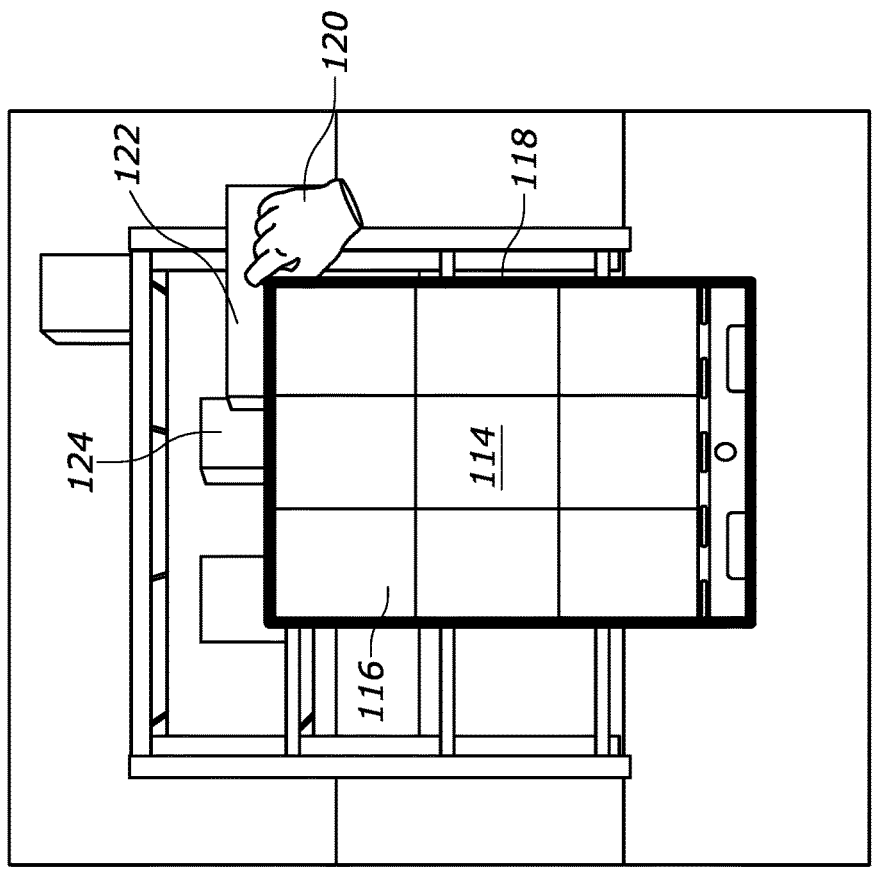
FIG. 10 illustrates an example user interface display in which a user may move a cursor to select additional objects to be included in a bounding box with the target object, in accordance with an embodiment.

Moreover, in some examples, the dimensioning application 112 may receive input from users (e.g., via the user interface 106) regarding the two-dimensional minimum bounding box 118. For example, a user may indicate, via the user interface 106, that the two-dimensional minimum bounding box does not include a portion of the target object 116, or does not include an object of a group of target objects. For instance, a user may select, on the viewfinder display for the three-dimensional camera 104 displayed by the user interface 106, the location of the portion of the target object 116, or an additional object associated with the target object 116, that should be included in the bounding box 118. For example, FIG. 10 illustrates a user interface display in which a user may move a cursor 120 on the user interface 106 to select additional objects 122 and 124 to be included in the bounding box 118 with the target object 116. FIG. 11 illustrates a user interface display of a representation of a corrected two-dimensional minimum bounding box 118 for the first side 114 of the target object 116 overlaid over a viewfinder display of the target object 116. In particular, the corrected two-dimensional minimum bounding box 118 as shown in FIG. 11 includes the additional objects 122 and 124, as well as the target object 116.

Figure 13:
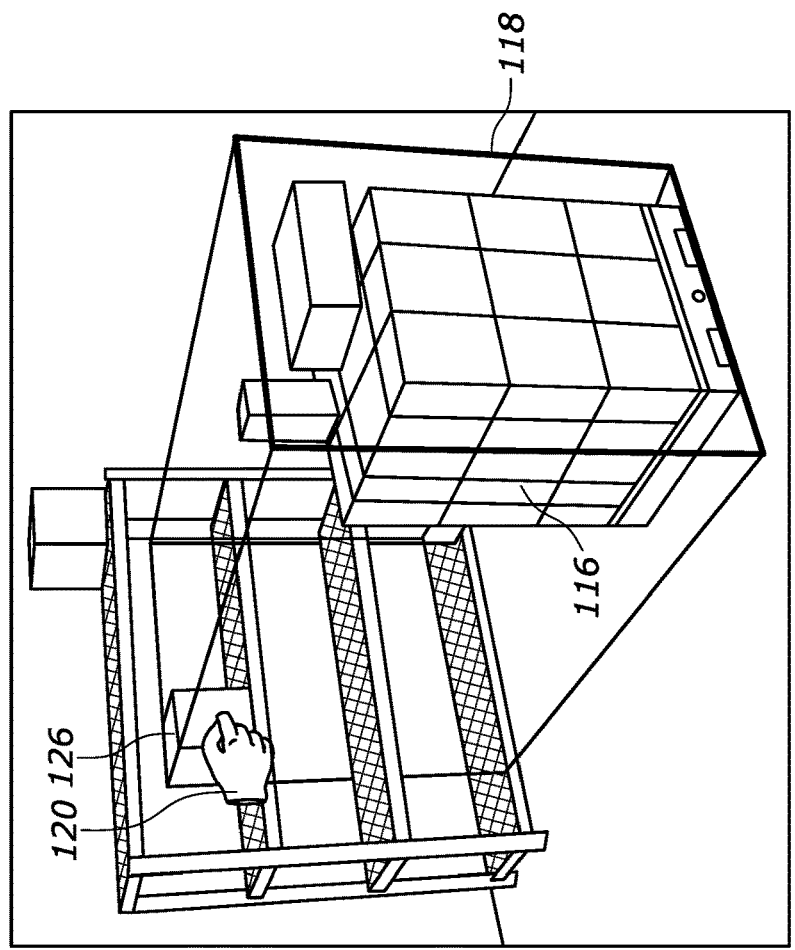
FIGS. 12 and 13 illustrate a user interface display in which a user may move a cursor to select an object that the user wishes to exclude from the two-dimensional minimum bounding box containing the first side of the target object, in accordance with an embodiment.
Figure 12:
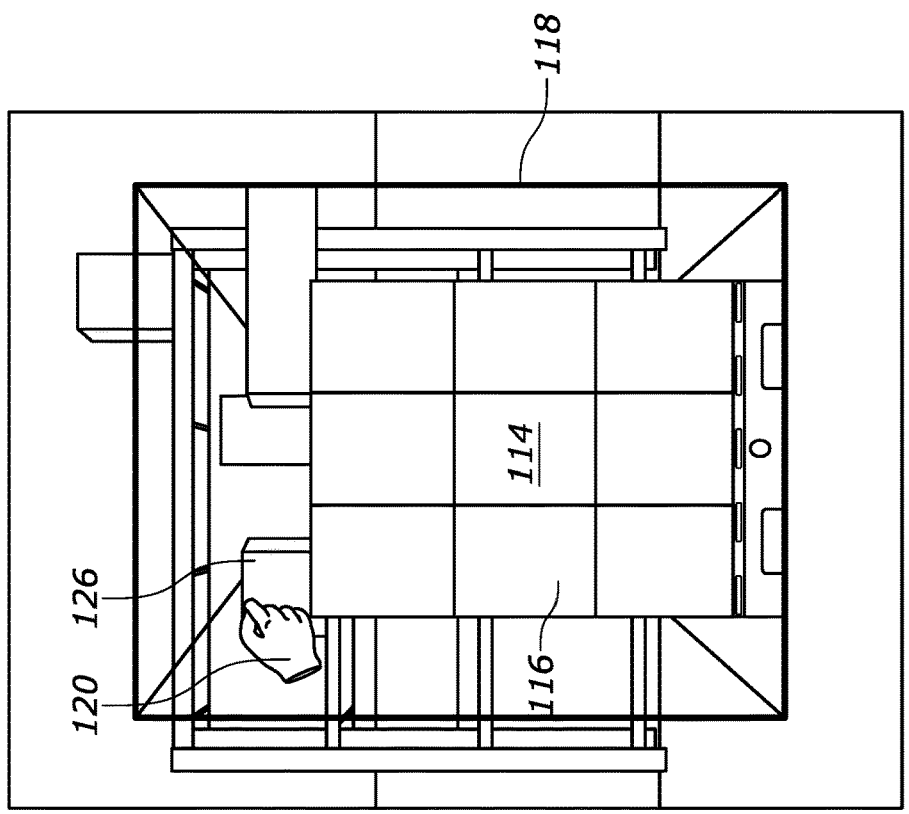

Similarly, a user may indicate, via the user interface 106, that the two-dimensional minimum bounding box 118 includes something that is not associated with the target object 116 or group of objects (e.g., an additional object near the target object 116). For instance, a user may select, on the viewfinder display for the three-dimensional camera 104 displayed by the user interface 106, the location of the additional object that should not be included in the bounding box 118. For example, FIGS. 12 and 13 illustrate a user interface display in which a user may move a cursor 120 on the user interface 106 to select an object 126 that is currently included in the bounding box 118 with the target object 116 that the user wishes to exclude from the bounding box 118.

Based on the information provided by the user via the user interface 106, the dimensioning application 112 may correct the two-dimensional minimum bounding box 118 to include or exclude additional objects as needed, and may and determine a corrected height and width for the target object 116 based on the corrected two-dimensional minimum bounding box 118. In some examples, the dimensioning application may display an image representing the corrected two-dimensional minimum bounding box 118 (e.g., an image representing the corrected two-dimensional minimum bounding box 118 overlaid over the viewfinder display for the three-dimensional camera 104). The dimensioning application 112 may make additional corrections to the two-dimensional minimum bounding box 118 as needed based on user input, e.g., until a user provides additional input indicating his or her satisfaction with the two-dimensional minimum bounding box 118. Accordingly, the dimensioning application 112 may determine a (in some cases, corrected) height and width for the first side of the target object 116 based on the final corrected two-dimensional minimum bounding box 118. It should be noted that, in other examples, the mobile computing device 102 may determine a height and a width for the bounding box 118 without receiving user input.

Figure 14:
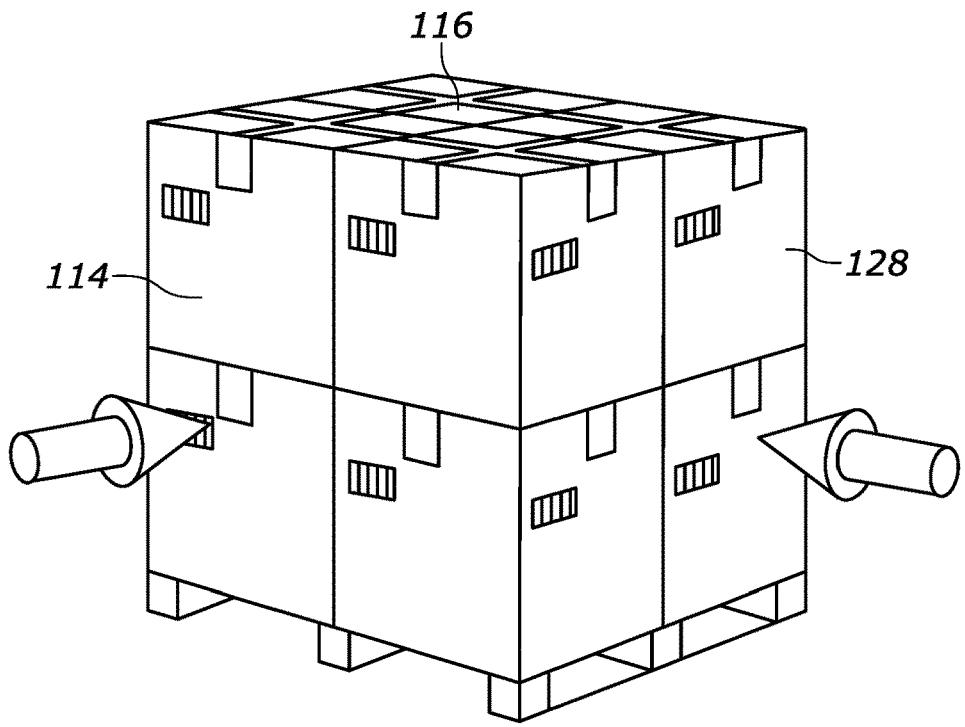
FIGS. 14 and 15 illustrate two views of an example first and second orthogonal faces of the target object, in accordance with an embodiment.
Figure 15:
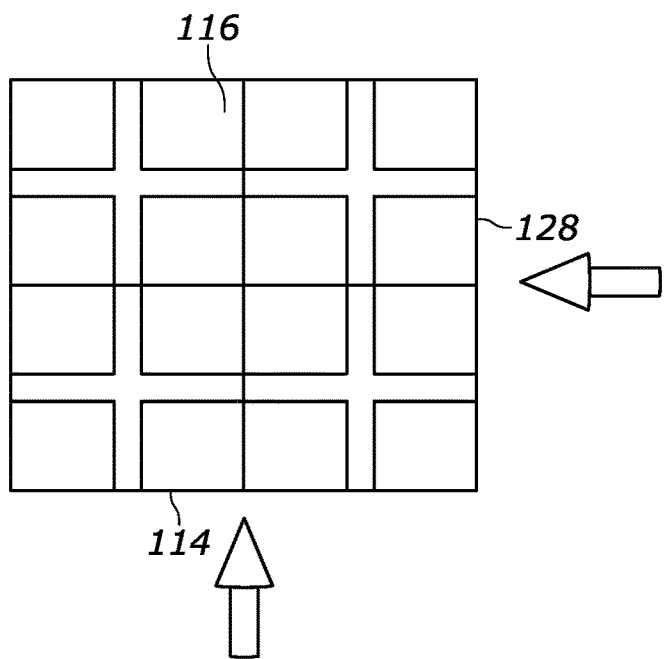

The dimensioning application 112 may cause the user interface 106 to display an indication that a user should position the three-dimensional camera 104 of the mobile computing device 102 to face a second side or face of the target object 116. In particular, the second side or face of the target object 116 is orthogonal to the first side or face of the target object. For example, FIGS. 14 and 15 illustrate two views of the first face 114 and second (orthogonal) face or side 128 of the target object 116.

Figure 16:
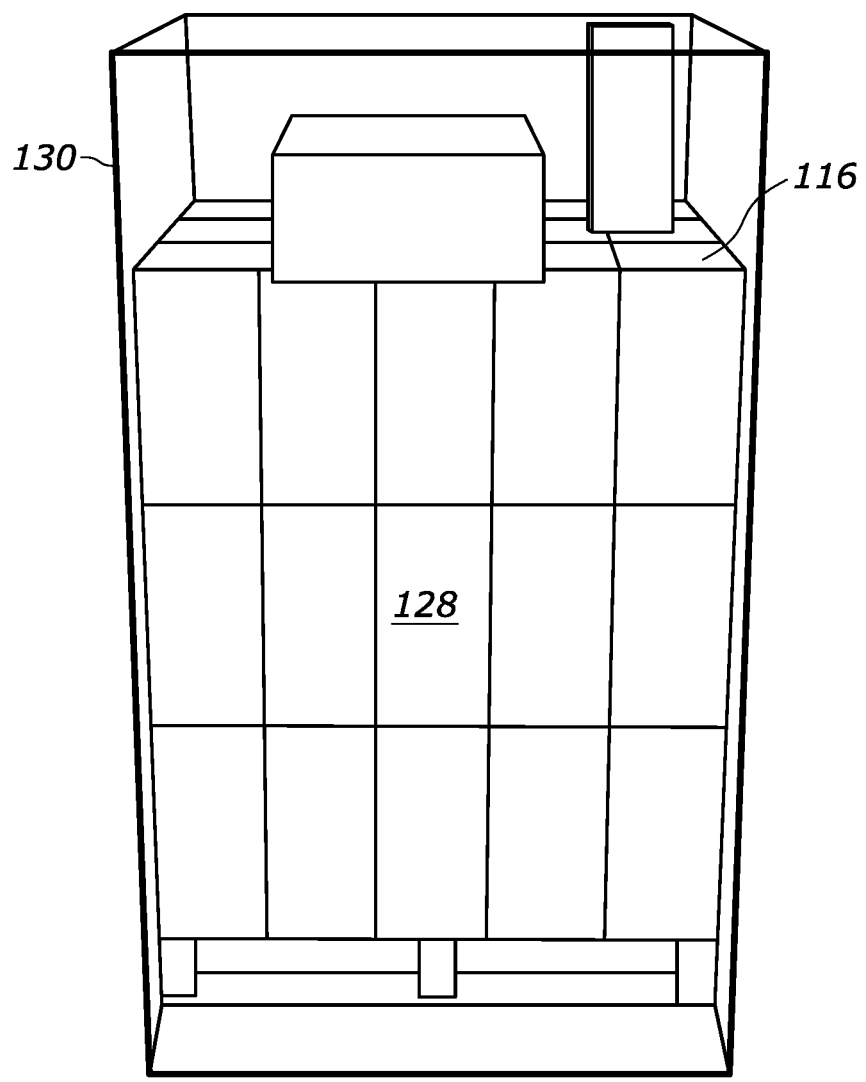
FIG. 16 illustrates an example user interface display showing a representation of a two-dimensional minimum bounding box containing a second side of the target object, overlaid over a viewfinder display of the target object, in accordance with an embodiment.

As discussed with respect to the first side of the target object 116, a three-dimensional image of the second side 128 of the target object 116 may be captured, and a two-dimensional minimum bounding box for the second side 128 of the target object 116 may be generated. For example, FIG. 16 illustrates an example user interface display showing a representation of a two-dimensional minimum bounding box 130 for the second side 128 of the target object 116 overlaid over a viewfinder display of the target object 116.

Figure 17:
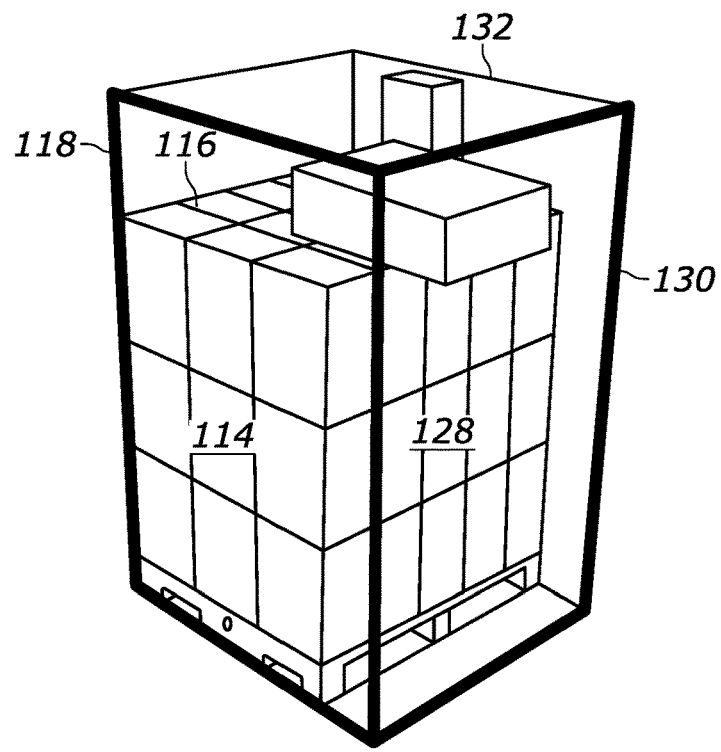
FIGS. 17 and 18 illustrate how the two-dimensional minimum bounding box containing the first side of the target object and the two-dimensional minimum bounding box containing the second side of the target object may be combined to form a three-dimensional minimum bounding box containing the target object, in accordance with an embodiment.
Figure 18:
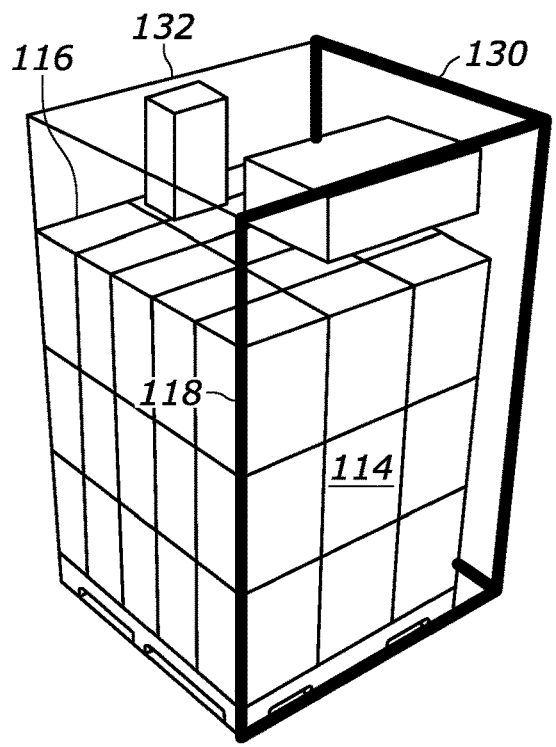

In some examples, the two-dimensional minimum bounding box 130 for the second side or face 128 of the target object 116 corrected as needed based on user input, as with the first side 114. Accordingly, the dimensioning application 112 may determine a (in some cases, corrected) height and width for the second side 128 of the target object 116. The dimensioning application 112 may determine dimensions of the target object 116 using the height and width for the first side 114 of the target object 116 and the height and width for the second side 128 of the target object 116. In particular, the dimensioning application may generate a three-dimensional bounding box for the target object 116 using the two-dimensional minimum bounding boxes 118 and 130. As shown in FIGS. 17 and 18, the shared height of the bounding boxes 118 and 130, and the width of each of the bounding boxes 118 and 130 form a three-dimensional bounding box 132 for the target object 116 (or group of target objects).

In particular, the dimensioning application may generate the three-dimensional bounding box 132 for the target object 116 using the greater of the two heights (of the bounding box 118 and the bounding box 130) as the height of the three-dimensional bounding box 132, the width of the bounding box 118 as the width of the three-dimensional bounding box 132, and the width of the bounding box 130 as the depth of the three-dimensional bounding box 132. Accordingly, the target object 116 or group of target objects may be dimensioned using the three dimensions of the three-dimensional bounding box 132.

Figure 19:
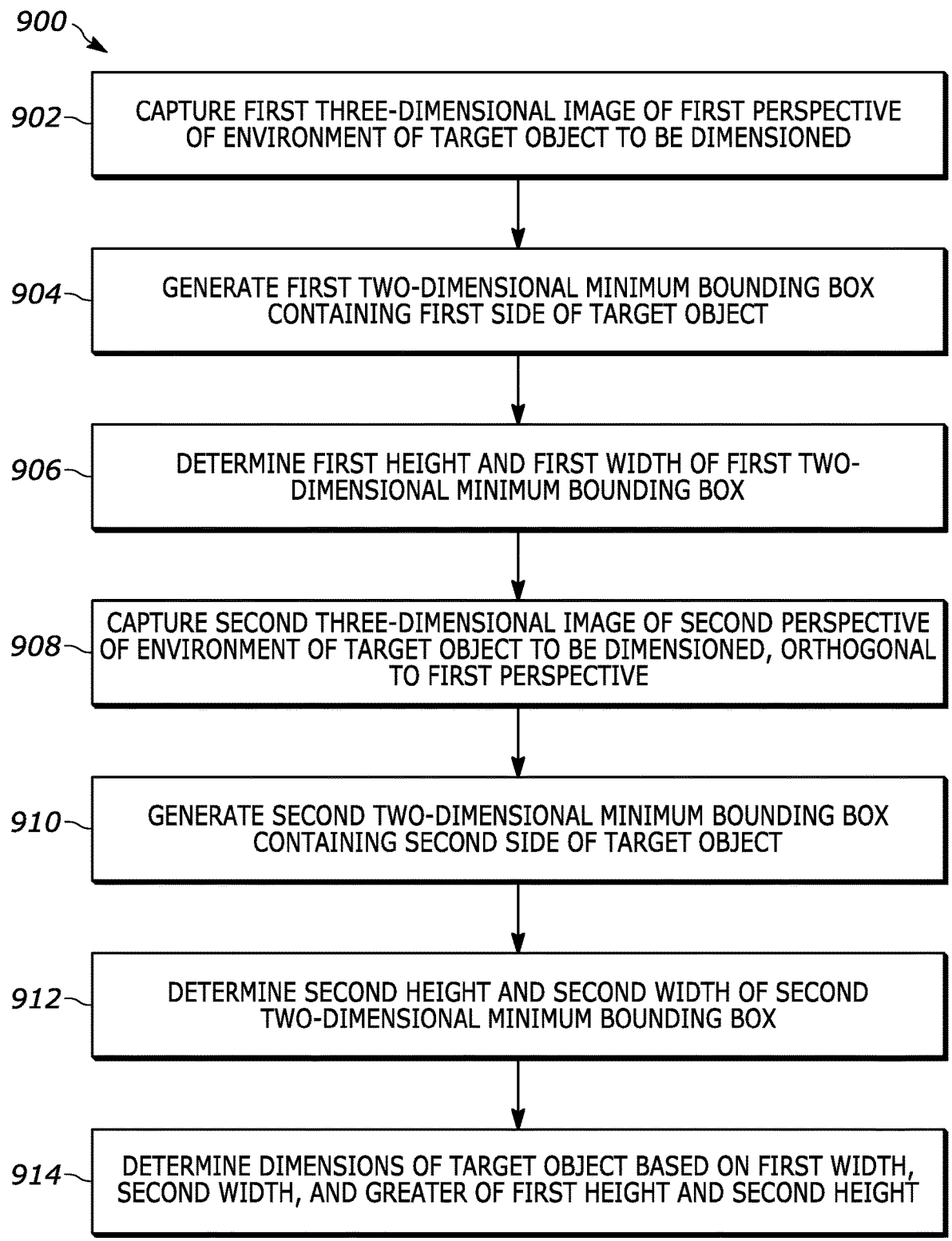
FIG. 19 illustrates a flow diagram of an example computer-implemented method of dimensioning a target object, in accordance with an embodiment.

Referring now to FIG. 19, the flow diagram 900 illustrates an example computer-implemented method of dimensioning a target object. One or more steps of the method 900 may be implemented as a set of instructions stored on a computer-readable memory and executable on one or more processors.

At block 902, a first three-dimensional image (and/or point cloud) of a first perspective of an environment containing a target object to be dimensioned may be captured by a three-dimensional camera. At block 904, a first two-dimensional minimum bounding box containing a first side of the target object may be generated (discussed in greater detail with respect to FIG. 20). In some examples, a corrected first two-dimensional minimum bounding box may be generated, as discussed in greater detail with respect to FIGS. 21 and 22. At block 906, a first height and a first width of the first two-dimensional minimum bounding box containing the first side of the target object may be determined. At block 908, a second three-dimensional image (and/or point cloud) of a second perspective (orthogonal to the first perspective) of the image containing the target object may be captured by the three-dimensional camera. At block 910, a second two-dimensional minimum bounding box containing a second side of the target object may be generated based on the second three-dimensional image or point cloud (discussed in greater detail with respect to FIG. 20). In some examples, a corrected second two-dimensional minimum bounding box may be generated, as discussed in greater detail with respect to FIGS. 21 and 22. At block 912, a second height and a second width of the second two-dimensional minimum bounding box containing the second side of the target object may be determined.

At block 914, dimensions of the target object may be determined based on the first width, the second width, and the greater of the first height and the second height. For instance, in some examples, a three-dimensional minimum bounding box containing the target object may be generated, with the width of the three-dimensional bounding box being the first width, the depth of the three-dimensional bounding box being the second width, and the height of the three-dimensional bounding box being the greater of the first height and the second height.

Figure 20:
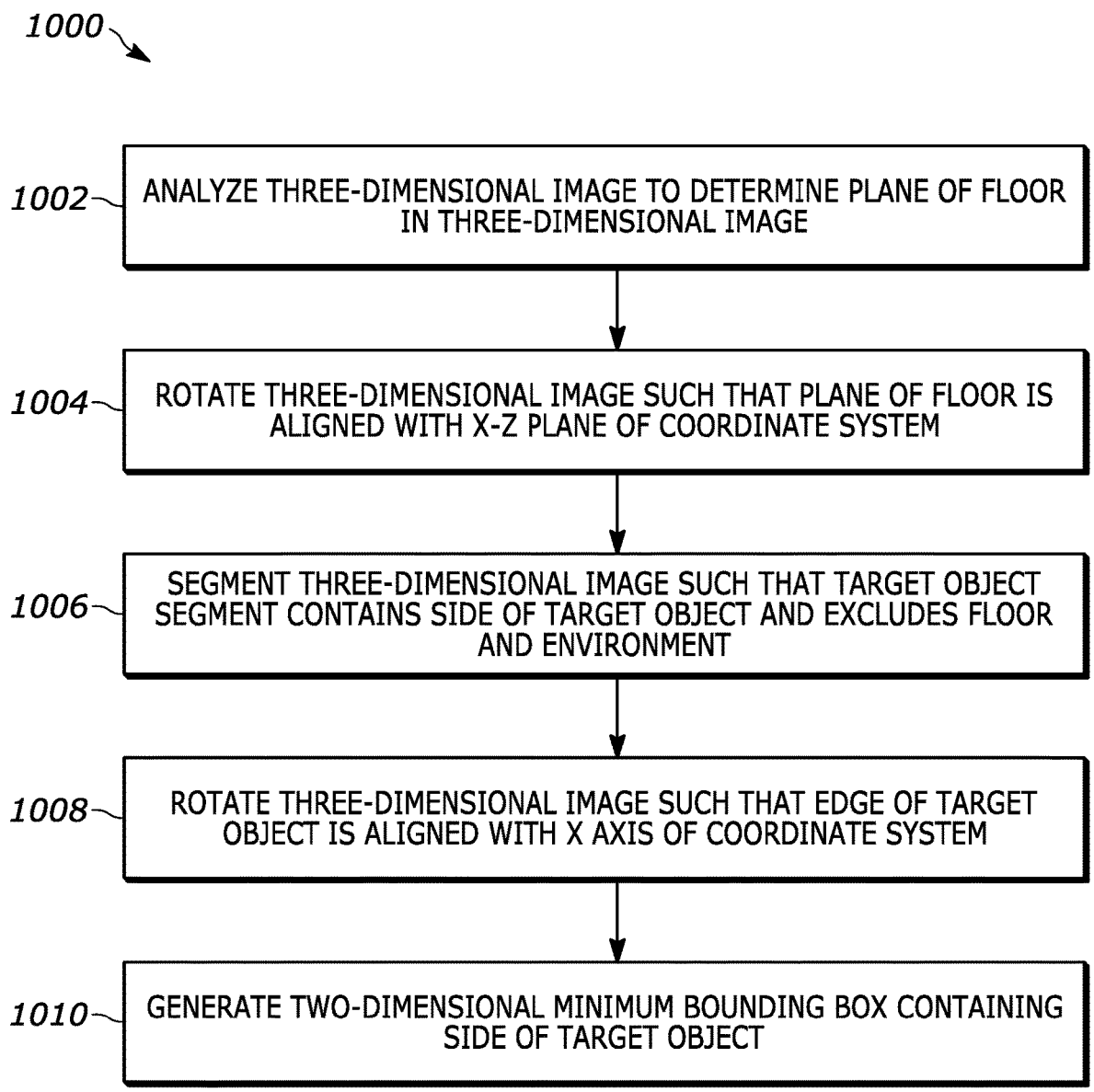
FIG. 20 illustrates a flow diagram of an example computer-implemented method of generating a two-dimensional minimum bounding box containing a side of a target object, in accordance with an embodiment.

Referring now to FIG. 20, the flow diagram 1000 illustrates an example computer-implemented method of generating a two-dimensional minimum bounding box containing a side of a target object (e.g., the first side of the target object, or the second side of the target object discussed with respect to FIG. 19). One or more steps of the method 1000 may be implemented as a set of instructions stored on a computer-readable memory and executable on one or more processors.

At block 1002, the three-dimensional image may be analyzed to determine a plane of a floor in the three-dimensional image. At block 1004, the three-dimensional image may be rotated such that the plane of the floor is aligned with an X-Z plane of a coordinate system. At block 1006, the three-dimensional image may be segmented such that a target object segment of the three-dimensional image contains the side of the target object and excludes the floor and the environment. At block 1008, the three-dimensional image may be rotated such that an edge of the target object is aligned with an X axis of the coordinate system. At block 1010, a two-dimensional minimum bounding box containing the side of the target object segment may be generated.

Figure 21:
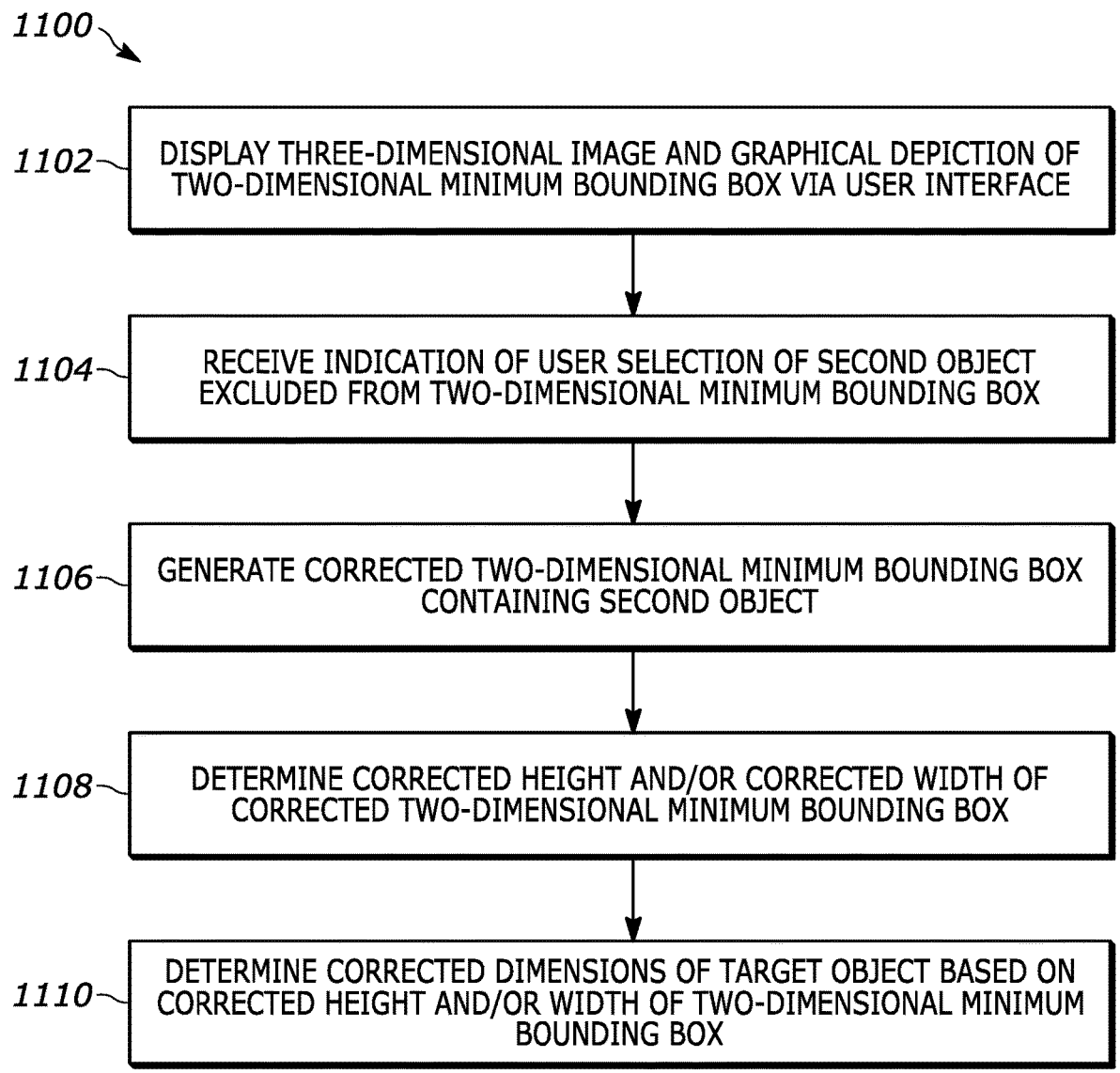
FIG. 21 illustrates a flow diagram of an example computer-implemented method of correcting an initial two-dimensional minimum bounding box.

Referring now to FIG. 21, the flow diagram 1100 illustrates an example computer-implemented method of correcting an initial two-dimensional minimum bounding box (e.g., the first two-dimensional minimum bounding box or the second two-dimensional minimum bounding box). One or more steps of the method 1100 may be implemented as a set of instructions stored on a computer-readable memory and executable on one or more processors.

At block 1102, the first (or the second) three-dimensional image and a graphical depiction of the first (or the second) two-dimensional minimum bounding box may be displayed via a user interface. For instance, the graphical depiction of the two-dimensional minimum bounding box may be displayed overlaid over the three-dimensional image. At block 1104, an indication of a user selection of a second object excluded from the first two-dimensional minimum bounding box may be received by the user interface. At block 1106, a corrected two-dimensional minimum bounding box containing the target object and the second object may be generated based on the user selection. At block 1108, a corrected height and/or corrected width for the corrected two-dimensional minimum bounding box may be determined. At block 1110, corrected dimensions of the target object may be determined based on the corrected height and/or corrected width for the corrected two-dimensional minimum bounding box.

For instance, if the corrected two-dimensional minimum bounding box is the first two-dimensional minimum bounding box, the corrected dimensions of the target object may be determined based on the corrected first width, the second width, and the greater of the corrected first height and the second height. Similarly, if the corrected two-dimensional minimum bounding box is the second two-dimensional minimum bounding box, the corrected dimensions of the target object may be determined based on the first width, the corrected second width, and the greater of the corrected first height and the second height. In some examples, both the first two-dimensional minimum bounding box and the second two-dimensional minimum bounding box may be corrected, in which case the corrected dimensions of the target object may be determined based on the corrected first width, the corrected second width, and the greater of the corrected first height and the corrected second height.

Figure 22:
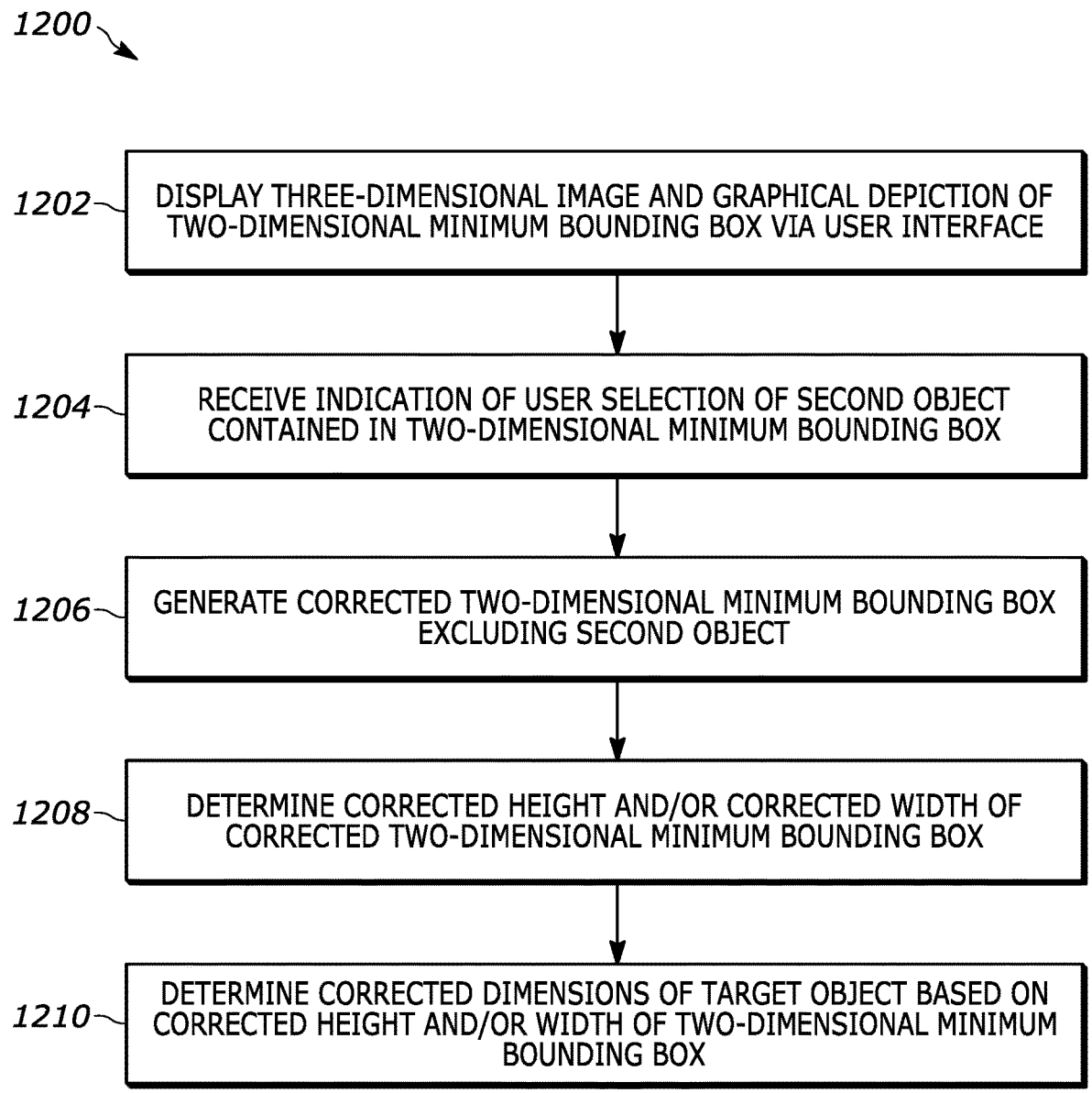
FIG. 22 illustrates a flow diagram of an example computer-implemented method of correcting an initial two-dimensional minimum bounding box.

Referring now to FIG. 22, the flow diagram 1200 illustrates an example computer-implemented method of correcting an initial two-dimensional minimum bounding box (e.g., the first two-dimensional minimum bounding box or the second two-dimensional minimum bounding box). One or more steps of the method 1200 may be implemented as a set of instructions stored on a computer-readable memory and executable on one or more processors.

At block 1202, the first (or the second) three-dimensional image and a graphical depiction of the first (or the second) two-dimensional minimum bounding box may be displayed via a user interface. For instance, the graphical depiction of the two-dimensional minimum bounding box may be displayed overlaid over the three-dimensional image. At block 1204, an indication of a user selection of a second object contained in the first two-dimensional minimum bounding box may be received by the user interface. At block 1106, a corrected two-dimensional minimum bounding box containing the target object and excluding the second object may be generated based on the user selection. At block 1208, a corrected height and/or corrected width for the corrected two-dimensional minimum bounding box may be determined. At block 1210, corrected dimensions of the target object may be determined based on the corrected height and/or corrected width for the corrected two-dimensional minimum bounding box.

For instance, if the corrected two-dimensional minimum bounding box is the first two-dimensional minimum bounding box, the corrected dimensions of the target object may be determined based on the corrected first width, the second width, and the greater of the corrected first height and the second height. Similarly, if the corrected two-dimensional minimum bounding box is the second two-dimensional minimum bounding box, the corrected dimensions of the target object may be determined based on the first width, the corrected second width, and the greater of the corrected first height and the second height. In some examples, both the first two-dimensional minimum bounding box and the second two-dimensional minimum bounding box may be corrected, in which case the corrected dimensions of the target object may be determined based on the corrected first width, the corrected second width, and the greater of the corrected first height and the corrected second height.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

Additionally, as used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A dimensioning method, comprising:
    capturing, by a three-dimensional camera from a first perspective, a first three-dimensional image of an environment containing a target object to be dimensioned;
    generating, by a processor, based on the first three-dimensional image, a first two-dimensional minimum bounding box containing a first side of the target object;
    determining, by the processor, a first height and a first width of the first two-dimensional minimum bounding box containing the first side of the target object;
    capturing, by the three-dimensional camera from a second perspective that is orthogonal to the first perspective, a second three-dimensional image of the environment containing the target object to be dimensioned;
    generating, by the processor, based on the second three-dimensional image, a second two-dimensional minimum bounding box containing a second side of the target object;
    determining, by the processor, a second height and a second width of the second two-dimensional minimum bounding box containing the second side of the target object; and
    determining, by the processor, dimensions of the target object based on the first width, the second width, and the greater of the first height and the second height.

2. The dimensioning method of claim 1, further comprising:
    displaying, by a user interface, the first three-dimensional image and a graphical depiction of the first two-dimensional minimum bounding box;
    receiving, by the user interface, an indication of a user selection of a second object contained in the first two-dimensional minimum bounding box;
    generating, by the processor, based on the user selection, one or more of a corrected first height and a corrected first width for a corrected two-dimensional minimum bounding box containing the target object and excluding the second object; and
    determining, by the processor, corrected dimensions of the target object based on the corrected first width, the second width, and the greater of the corrected first height and the second height.

3. The dimensioning method of claim 1, further comprising:
    displaying, by a user interface, the first three-dimensional image and a graphical depiction of the first two-dimensional minimum bounding box;
    receiving, by the user interface, an indication of a user selection of a second object not contained in the first two-dimensional minimum bounding box;
    generating, by the processor, based on the user selection, one or more of a corrected first height and a corrected first width for a corrected two-dimensional minimum bounding box containing the target object and including the second object; and
    determining corrected dimensions of the target object based on the corrected first width, the second width, and the greater of the corrected first height and the second height.

4. The dimensioning method of claim 1, further comprising:
    displaying, by a user interface, the second three-dimensional image and a graphical depiction of the second two-dimensional minimum bounding box;
    receiving, by the user interface, an indication of a user selection of a second object contained in the second two-dimensional minimum bounding box;
    generating, by the processor, based on the user selection, one or more of a corrected first height and a corrected first width for a corrected second two-dimensional minimum bounding box containing the target object and excluding the second object; and
    determining, by the processor, corrected dimensions of the target object based on the first width, the corrected second width, and the greater of the first height and the corrected second height.

5. The dimensioning method of claim 1, further comprising:
    displaying, by a user interface, the second three-dimensional image and a graphical depiction of the second two-dimensional minimum bounding box;
    receiving, by the user interface, an indication of a user selection of a second object not contained in the second two-dimensional minimum bounding box;
    generating, by the processor, based on the user selection, one or more of a corrected second height and a corrected second width for a corrected second two-dimensional minimum bounding box containing the target object and including the second object; and
    determining corrected dimensions of the target object based on the first width, the corrected second width, and the greater of the first height and the corrected second height.

6. The dimensioning method of claim 1, wherein the first and second two-dimensional minimum bounding boxes are two-dimensional axis-aligned minimum bounding boxes.

7. The dimensioning method of claim 1, wherein generating the first two-dimensional minimum bounding box containing the target object comprises:
    analyzing, by the processor, the first three-dimensional image to determine a plane of a floor in the first three-dimensional image;
    rotating, by the processor, the first three-dimensional image such that the plane of the floor is aligned with an X-Z plane of a coordinate system;
    rotating, by the processor, the first three-dimensional image such that an edge of the target object is aligned with an X axis of the coordinate system;
    segmenting, by the processor, the first three-dimensional image such that a target object segment of the first three-dimensional image contains the first side of the target object and excludes the floor and the environment containing the target object to be dimensioned; and generating, by the processor the first two-dimensional minimum bounding box containing the first side of the target object.

8. The dimensioning method of claim 1, wherein generating the second two-dimensional minimum bounding box containing the target object comprises:
analyzing, by the processor, the second three-dimensional image to determine a plane of a floor in the second three-dimensional image;
rotating, by the processor, the second three-dimensional image such that the plane of the floor is aligned with an X-Z plane of a coordinate system;
rotating, by the processor, the second three-dimensional image such that an edge of the target object is aligned with an X axis of the coordinate system; and
segmenting, by the processor, the second three-dimensional image such that a target object segment of the second three-dimensional image contains the second side of the target object and excludes the floor and the environment containing the target object to be dimensioned; and
generating the second two-dimensional minimum bounding box containing the second side of the target object segment.

9. A mobile device, comprising:
a three-dimensional camera,
a memory storing computer executable instructions:
at least one processor configured to interface with the three-dimensional camera and the memory, and configured to execute the computer executable instructions to cause the mobile device to:
capture, by the three-dimensional camera from a first perspective, a first three-dimensional image of an environment containing a target object to be dimensioned;
generate, by the at least one processor, based on the first three-dimensional image, a first two-dimensional minimum bounding box containing a first side of the target object;
determine, by the at least one processor, a first height and a first width of the first two-dimensional minimum bounding box containing the first side of the target object;
capture, by the three-dimensional camera from a second perspective that is orthogonal to the first perspective, a second three-dimensional image of the environment containing the target object to be dimensioned;
generate, by the at least one processor, based on the second three-dimensional image, a second two-dimensional minimum bounding box containing a second side of the target object;
determine, by the at least one processor, a second height and a second width of the second two-dimensional minimum bounding box containing the second side of the target object; and
determine, by the at least one processor, dimensions of the target object based on the first width, the second width, and the greater of the first height and the second height.

10. The mobile device of claim 9, further comprising a user interface, wherein the at least one processor is further configured to interface with the user interface, and wherein the computer executable instructions further cause the mobile device to:
display, by the user interface, the first three-dimensional image and a graphical depiction of the first two-dimensional minimum bounding box;
receive, by the user interface, an indication of a user selection of a second object contained in the first two-dimensional minimum bounding box;
generate, by the at least one processor, based on the user selection, one or more of a corrected first height and a corrected first width for a corrected two-dimensional minimum bounding box containing the target object and excluding the second object; and
determine, by the at least one processor, corrected dimensions of the target object based on the corrected first width, the second width, and the greater of the corrected first height and the second height.

11. The mobile device of claim 9, further comprising a user interface, wherein the at least one processor is further configured to interface with the user interface, and wherein the computer executable instructions further cause the mobile device to:
display, by the user interface, the first three-dimensional image and a graphical depiction of the first two-dimensional minimum bounding box;
receive, by the user interface, an indication of a user selection of a second object not contained in the first two-dimensional minimum bounding box;
generate, by the at least one processor, based on the user selection, one or more of a corrected first height and a corrected first width for a corrected two-dimensional minimum bounding box containing the target object and including the second object; and
determine, by the at least one processor, corrected dimensions of the target object based on the corrected first width, the second width, and the greater of the corrected first height and the second height.

12. The mobile device of claim 9, further comprising a user interface, wherein the at least one processor is further configured to interface with the user interface, and wherein the computer executable instructions further cause the mobile device to:
display, by the user interface, the second three-dimensional image and a graphical depiction of the second two-dimensional minimum bounding box;
receive, by the user interface, an indication of a user selection of a second object contained in the second two-dimensional minimum bounding box;
generate, by the at least one processor, based on the user selection, one or more of a corrected second height and a corrected second width for a corrected second two-dimensional minimum bounding box containing the target object and excluding the second object; and
determine, by the at least one processor, corrected dimensions of the target object based on the first width, the corrected second width, and the greater of the first height and the corrected second height.

13. The mobile device of claim 9, further comprising a user interface, wherein the at least one processor is further configured to interface with the user interface, and wherein the computer executable instructions further cause the mobile device to:
display, by the user interface, the second three-dimensional image and a graphical depiction of the second two-dimensional minimum bounding box;
receive, by the user interface, an indication of a user selection of a second object not contained in the second two-dimensional minimum bounding box;

generate, by the at least one processor, based on the user selection, one or more of a corrected second height and a corrected second width for a corrected second two-dimensional minimum bounding box containing the target object and including the second object; and determine, by the at least one processor, corrected dimensions of the target object based on the first width, the corrected second width, and the greater of the first height and the corrected second height.

14. The mobile device of claim 9, wherein the first and second two-dimensional minimum bounding boxes are two-dimensional axis-aligned minimum bounding boxes.

15. The mobile device of claim 9, wherein the computer executable instructions cause the mobile device to generate the first two-dimensional minimum bounding box containing the target object by:

analyze, by the at least one processor, the first three-dimensional image to determine a plane of a floor in the first three-dimensional image;

rotate, by the at least one processor, the first three-dimensional image such that the plane of the floor is aligned with an X-Z plane of a coordinate system;

rotate, by the at least one processor, the first three-dimensional image such that an edge of the target object is aligned with an X axis of the coordinate system;

segment, by the at least one processor, the first three-dimensional image such that a target object segment of the first three-dimensional image contains the first side of the target object and excludes the floor and the environment containing the target object to be dimensioned; and generate, by the at least one processor, the first two-dimensional minimum bounding box containing the first side of the target object segment.

16. The mobile device of claim 9, wherein the computer executable instructions cause the mobile device to generate the second two-dimensional minimum bounding box containing the target object by:

analyze, by the at least one processor, the second three-dimensional image to determine a plane of a floor in the first three-dimensional image;

rotate, by the at least one processor, the second three-dimensional image such that the plane of the floor is aligned with an X-Z plane of a coordinate system;

rotate, by the at least one processor, the second three-dimensional image such that an edge of the target object is aligned with an X axis of the coordinate system;

segment, by the at least one processor, the second three-dimensional image such that a target object segment of the second three-dimensional image contains the second side of the target object and excludes the floor and the environment containing the target object to be dimensioned; and generate, by the at least one processor, a second two-dimensional minimum bounding box containing the second side of the target object segment.

* * * * *